(12) United States Patent
Mathieu et al.

(10) Patent No.: US 9,440,580 B2
(45) Date of Patent: Sep. 13, 2016

(54) OPTIC ASSEMBLY HAVING VIRTUAL EXTERNAL COMMON FOCUS

(71) Applicant: Muth Mirror Systems, LLC, Sheboygan, WI (US)

(72) Inventors: Daniel J. Mathieu, Sheboygan Falls, WI (US); Seth Van Gheem, Sheboygan, WI (US); Thomas W. Reuter, Bayside, WI (US)

(73) Assignee: Muth Mirror Systems, LLC, Sheboygan, WI (US)

( * ) Notice: Subject to any disclaimer, the term of this patent is extended or adjusted under 35 U.S.C. 154(b) by 103 days.

(21) Appl. No.: 13/683,526

(22) Filed: Nov. 21, 2012

(65) Prior Publication Data

US 2013/0141931 A1   Jun. 6, 2013

Related U.S. Application Data

(60) Provisional application No. 61/563,270, filed on Nov. 23, 2011.

(51) Int. Cl.
| | |
|---|---|
| *F21V 7/00* | (2006.01) |
| *B60Q 1/34* | (2006.01) |
| *B60Q 1/26* | (2006.01) |
| *G02B 27/14* | (2006.01) |
| *G02B 19/00* | (2006.01) |
| *B60R 1/12* | (2006.01) |
| *G09F 21/04* | (2006.01) |

(52) U.S. Cl.
CPC ............... *B60Q 1/34* (2013.01); *B60Q 1/2665* (2013.01); *B60R 1/12* (2013.01); *G02B 19/0023* (2013.01); *G02B 27/143* (2013.01); *B60R 2001/1215* (2013.01); *G09F 21/04* (2013.01)

(58) Field of Classification Search
CPC ...... B60Q 1/00; B60Q 2200/30; B60Q 1/34; B60R 1/00; B60R 1/12; B60R 2001/1215; G02B 19/0023; G02B 27/143; G09F 21/04; G09F 21/04
USPC .......................................... 362/516, 487, 494
See application file for complete search history.

(56) References Cited

U.S. PATENT DOCUMENTS

| | | | |
|---|---|---|---|
| 5,361,190 | A | 11/1994 | Roberts |
| 5,373,280 | A | 12/1994 | Louy et al. |

(Continued)

FOREIGN PATENT DOCUMENTS

| | | |
|---|---|---|
| EP | 1970736 | 9/2008 |
| EP | 2042373 | 4/2009 |

(Continued)

OTHER PUBLICATIONS

U.S. Appl. No. 12/871,727, Mathieu.

(Continued)

*Primary Examiner* — Renee Chavez
*Assistant Examiner* — Jessica M Apenteng
(74) *Attorney, Agent, or Firm* — Jennifer L. Gregor; Godfrey & Kahn, S.C.

(57) ABSTRACT

An optic assembly has a reflector with a reflective surface, one or more light sources, and a mask with one or more apertures. Facets on the reflective surface direct light rays so that a substantial portion of the light rays within the optic assembly can be managed as if they were emitted from a focal point located outside the optic assembly.

11 Claims, 7 Drawing Sheets

(56) References Cited

U.S. PATENT DOCUMENTS

| | | |
|---|---|---|
| 5,788,357 A | 8/1998 | Muth |
| 6,045,243 A | 4/2000 | Muth et al. |
| 6,076,948 A | 6/2000 | Bukosky et al. |
| 6,257,746 B1 | 7/2001 | Todd et al. |
| 6,672,741 B1 | 1/2004 | Young |
| 7,008,091 B2 | 3/2006 | Mathieu |
| 7,246,921 B2 | 7/2007 | Jacobson et al. |
| 7,273,307 B2 | 9/2007 | Mathieu |
| 7,306,355 B2 | 12/2007 | Walser |
| 7,327,321 B2 | 2/2008 | Todd et al. |
| 7,520,636 B2 | 4/2009 | Van Der Poel |
| 7,777,166 B2 | 8/2010 | Roberts |
| 8,425,101 B2 | 4/2013 | Boonekamp |
| 8,708,536 B1 | 4/2014 | Mathieu |
| 2005/0134953 A1 | 6/2005 | Mathieu et al. |
| 2005/0225994 A1 | 10/2005 | Rodriguez-Barros et al. |
| 2006/0012990 A1* | 1/2006 | Walser et al. ............ 362/235 |
| 2008/0068520 A1 | 3/2008 | Minikey et al. |
| 2009/0115631 A1 | 5/2009 | Foote et al. |
| 2009/0296417 A1 | 12/2009 | Luo et al. |
| 2010/0182143 A1 | 7/2010 | Lynam |

FOREIGN PATENT DOCUMENTS

| | | |
|---|---|---|
| JP | 2007514611 | 6/2007 |
| JP | 2008-175584 | 7/2008 |
| JP | 2008175584 | 7/2008 |
| JP | 2009-500212 | 1/2009 |
| JP | 2010-528444 | 8/2010 |
| KR | 102007021493 | 2/2007 |
| WO | WO2005062757 | 7/2005 |
| WO | WO 2007/001885 | 1/2007 |
| WO | WO 2008/146229 | 12/2008 |
| WO | WO2010055178 | 5/2010 |

OTHER PUBLICATIONS

PCT/US12/66332, Mathieu.
Office Action mailed Dec. 17, 2012 for U.S. Appl. No. 12/871,727.
Search Report mailed Feb. 8, 2013 for PCT/US12/66332.
Written opinion of the International Searching Authority for PCT/US12/66332 mailed Feb. 8, 2013.
Extended European search report for PCT/US2012066332; mailed Jul. 8, 2015.
Office Action issued for Japanese Patent Application No. 2014-543570 on Jun. 2, 2015.
Office Action issued for Korean Application No. 10-2014-7010304 on Jul. 20, 2015.
Office Action for JP 2014-543570.

* cited by examiner

OPTIC ASSEMBLY HAVING VIRTUAL EXTERNAL COMMON FOCUS

PRIORITY CLAIM/CROSS-REFERENCE TO RELATED APPLICATIONS

This application claims priority from U.S. Provisional Patent Application No. 61/563,270, filed on Nov. 23, 2011, which is incorporated herein by reference for all purposes.

FIELD OF THE INVENTION

The present invention relates generally to the field of optic assemblies for use with mirrors or other semitransparent substrates, including, but not limited to, mirrors used in vehicles although other applications are contemplated. More particularly, the present invention relates to an improved optic assembly in which facets on a reflective surface are used to direct light rays from one or more light sources so that a substantial portion of the light rays within the optic assembly can be managed as if they were emitted from a focal point outside the optic assembly.

BACKGROUND

Over the years, enhancements have been made to rearview mirrors for vehicles by using lights in conjunction with such mirrors to provide a number of lighted auxiliary features. For example, rearview mirrors can incorporate lighted auxiliary features including, but not limited to, turn signals, blind spot detection displays ("BSDDs"), hazard warning lights, brake lights, or parking assist lights. Rearview mirror enhancements such as these may have safety benefits, or may be desirable to vehicle drivers for other reasons such as functionality or aesthetics. But there are a number of challenges to designing an optimal, efficient, and cost effective lighting assembly for such applications.

The challenges presented in this field generally relate to the small space constraints within the housing of the rearview mirror and the functionality of the mirror itself and the lighted auxiliary features. Specifically, lighting assemblies used for such features must be sized to fit behind the mirror, but within the mirror housing. The lighting assemblies must also be small and limit mirror vibration. A variety of light sources can be used, but light-emitting diodes ("LEDs") are a common light source because they are small and generate large amounts of light, with lower energy consumption and heat generation, relative to their size. Any type of lights, however, generate heat and use energy. Thus, it is desirable to use fewer lights or LEDs to avoid excess heat and energy use. One additional aspect of designing lighted displays for rearview mirrors is that the visible light emitted from lighted auxiliary features should be sufficiently outside of or inside of the vehicle operator's line of sight during regular vehicle operation to avoid interfering with, or to augment, safe operation of the vehicle.

Early lighted auxiliary features for rearview mirrors were accomplished by using a simple "tilted LED" design, such as that disclosed in U.S. Pat. No. 6,257,746. In an embodiment of the tilted LED design, the lighting assembly is comprised of lights, such as LEDs, mounted on a substrate. The lights are positioned in an oblique orientation relative to the mirror, that is, they are "tilted" away from the vehicle operator's line of sight and are not pointing directly through the mirror. The tilted LED design also uses a light diverting substrate which substantially prevents the lighting assembly from being visible when the lights are unlit. In this design, one LED or light is required for each aperture through which light passes out of the mirror. Although this design is still currently used, the lighting assembly in this design uses multiple LEDs and therefore requires a substantial amount of energy and also takes up a relatively substantial space.

As an alternative to the tilted LED design, optic assemblies have also been used to provide the lighting assembly for lighted auxiliary features in rearview mirrors. One early type of optic assembly is disclosed in U.S. Pat. No. 6,045,243, which is an example of the "Fresnel and deviator" design. The Fresnel and deviator optic design uses two or more optical elements to substantially converge and redirect light from light sources through the mirror in a way that does not interfere with the line of sight of the vehicle driver. In this design, the light emitting portion of the light source is either positioned facing the mirror or obliquely thereto. Light from the light source is first substantially collected and converged by a lens which may have refracting portions, reflective portions, or both. The collected light rays are then diverted by an optical element or elements (i.e., the "deviator") by a certain amount, for example, 20-40 degrees from a line positioned normal to the front surface of the mirror, so that the light which is ultimately utilized by the lighted auxiliary feature and ultimately passed through the mirror does not interfere with the lines of sight of the vehicle operator. The Fresnel and deviator design may use a variety of different light sources, ranging from LEDs to light bulbs, but this design requires a relatively large amount of light and therefore uses a large amount of energy, emits a relatively large amount of heat and uses a relatively large amount of space.

Another type of optic assembly used is the "Paralocs" design that is disclosed in U.S. Pat. No. 6,076,948, and other patents. "Paralocs" is an abbreviation for Parabolic Array of LEDs on a Cut-Out Substrate. In the Paralocs design, the light sources used, typically LEDs, generally face away from the mirror, unlike the Fresnel and deviator design in which the light sources generally face the mirror. In the Paralocs design, light from the light source is substantially converged and directed at the same time with the use of a parabolic-shaped reflector. This design usually uses one reflector for each light source. Planar redirecting facets have also been used to increase efficiency and uniformity on Paralocs optics. This type of faceting redirects light that has already been significantly converged by another part of the optic. This allows the optic designer to use light from the far side of the LED, which would ordinarily be unused. However, the Paralocs design still requires one LED or light source per aperture through which light is emitted, and one reflector facet per LED or light source, and therefore still has some of the disadvantages of the earlier optical techniques.

Another type of optic used is referred to as a "Half Optic," and is described in U.S. Pat. No. 7,273,307. An example of this type of optic uses a small reflector to direct and converge light from a light source through an aperture. The light source in the Half Optic design faces the mirror and is also positioned quite close to the mirror. This design has special utility when trying to direct light at angles very close to the mirror surface, but has some of the same disadvantages regarding the number of LEDs or light sources required, and permits less sophisticated control over the direction of the light rays through the aperture.

One additional design is disclosed in pending U.S. application Ser. No. 12/871,727 titled OPTIC ASSEMBLY FOR MIRROR which is incorporated herein by reference for all purposes. The optic assembly disclosed in that application has a reflector with a reflective surface, one or more light sources, and mask assembly with one or more apertures. The mask assembly generally covers the reflector and one or more light sources are generally enclosed within the optic assembly between the mask assembly and the reflective surface of the reflector. Light rays from one or more light sources are substantially refocused and a portion of those light rays are substantially converged by facets on the reflective surface of the reflector so that light rays are emitted through one or more apertures in the mask assembly.

While the aforementioned designs provide ways to accomplish a number of lighted auxiliary features in mirrors, the aspects of size, cost, and efficiency of the light assemblies used still have not been fully optimized. As such, there remains a need for a lighting assembly that will reduce the cost and size of lighted auxiliary features in rearview mirrors. The optic assembly for mirrors of the present invention addresses many of these problems and can be used in mirror assemblies as well as other applications having similar performance requirements, e.g., puddle lights, lighting applications for which a generally rearward facing light or display would be useful, or for illuminating other types of lighted displays.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiments, and will be readily apparent to those skilled in the art. Such objects, features, benefits and advantages will be apparent from the above as taken in conjunction with the accompanying figures and all reasonable inferences to be drawn therefrom.

SUMMARY OF THE INVENTION

The optic assembly of the present invention has a reflector with a reflective surface, one or more light sources, and a mask. The mask has one or more apertures through which light can pass. The mask generally covers the reflector and one or more light sources are generally enclosed within the optic assembly between the mask and the reflective surface of the reflector. Facets on the reflective surface of the reflector direct light rays so that a substantial portion of the light rays within the optic assembly can be managed as if they were emitted from a focal point located outside the optic assembly. These and other features and advantages in accordance with this invention are described in, or are apparent from, the following description and accompanying Figures.

DETAILED DESCRIPTION

Figure 7:
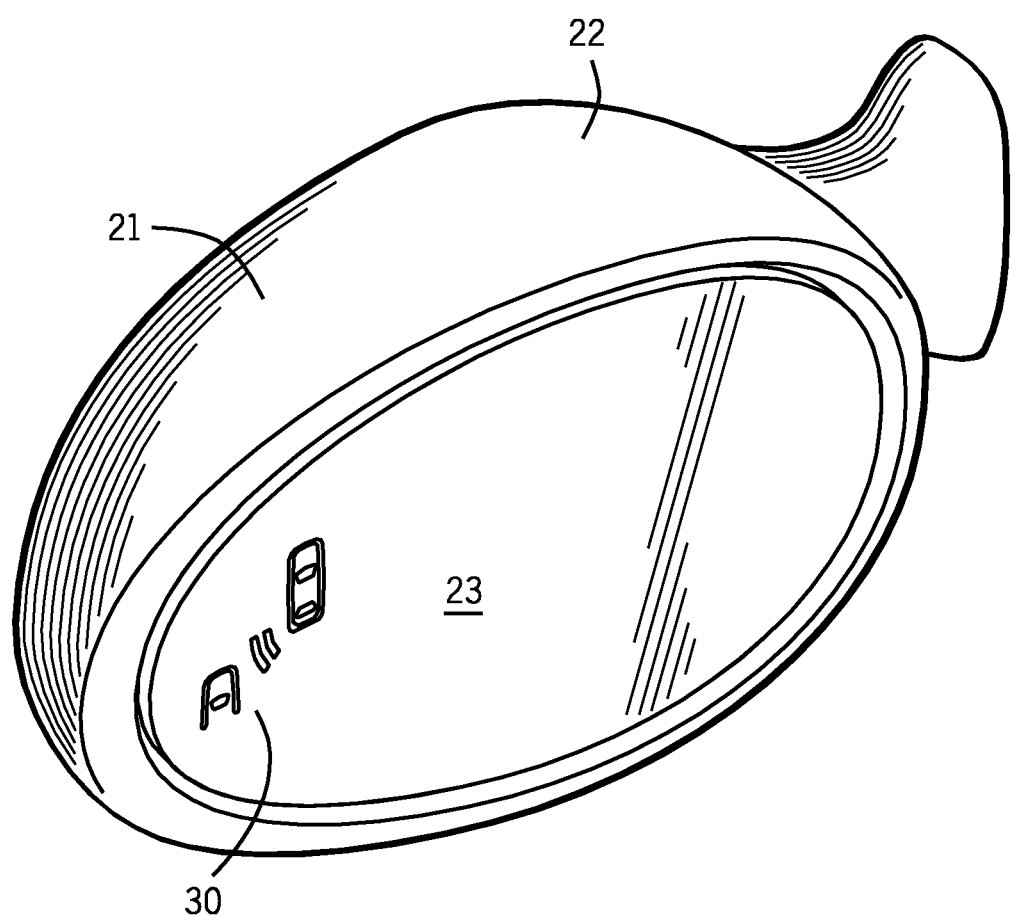
FIG. 7 is an environmental view of a mirror assembly in accordance with the present invention, which has an optic assembly used for a lighted BSDD auxiliary feature.
Figure 8:
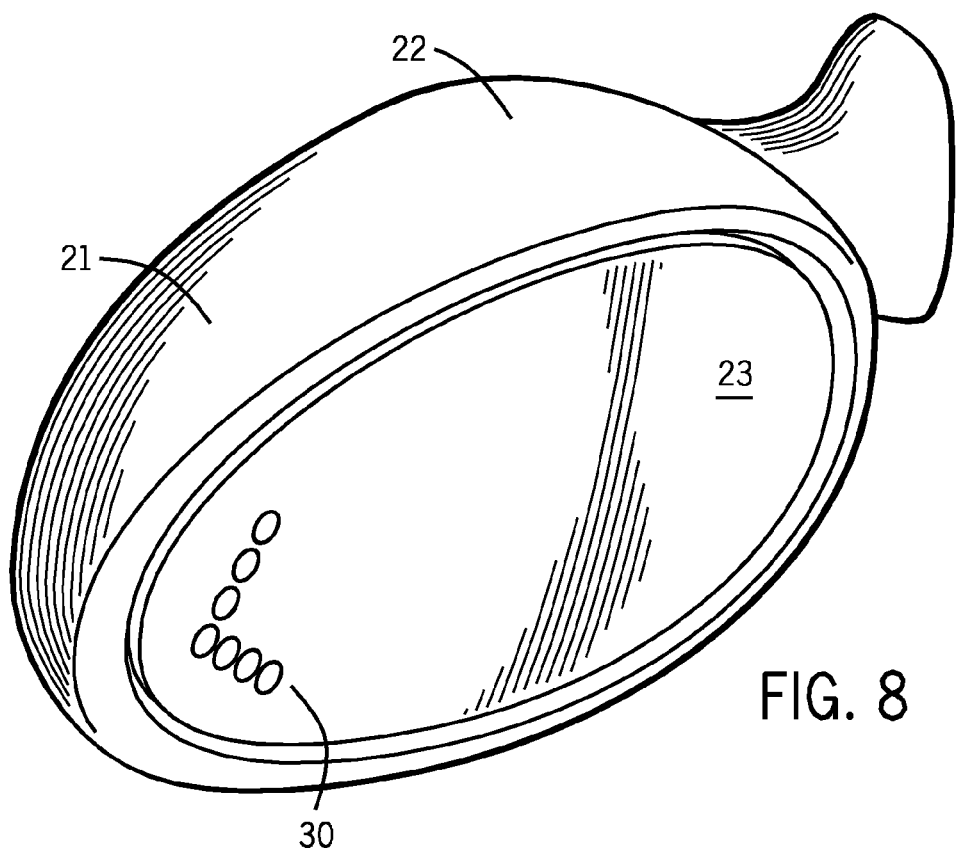
FIG. 8 is an environmental view of a mirror assembly in accordance with the present invention, which has an optic assembly used for a lighted turn signal auxiliary feature.
Figure 9:
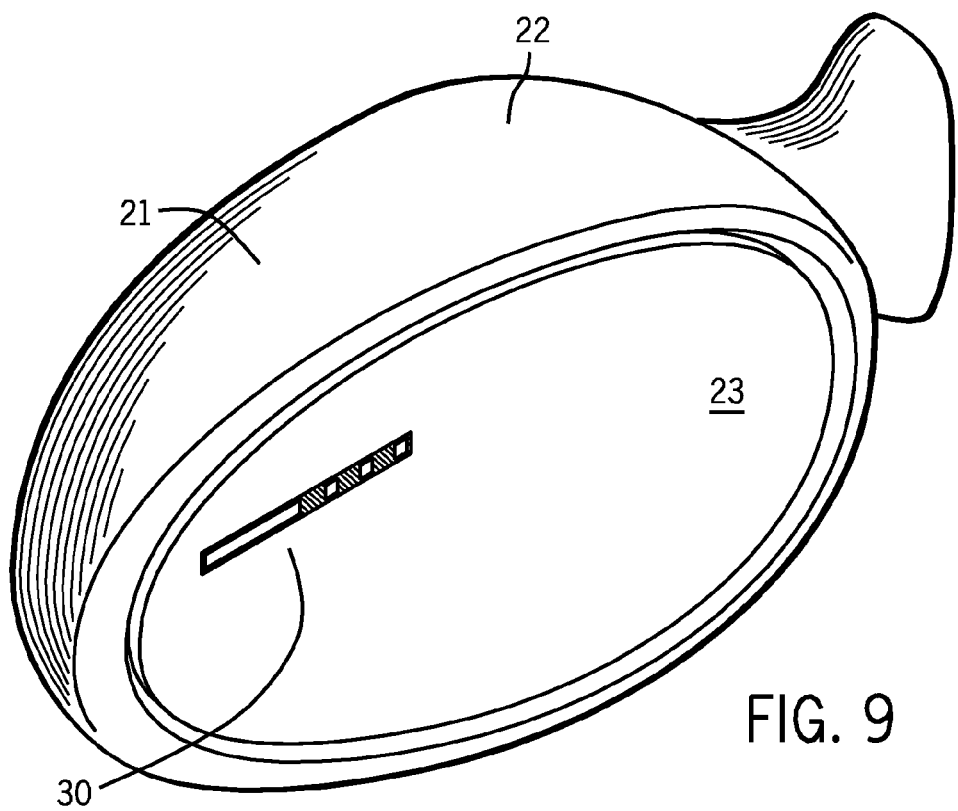
FIG. 9 is an environmental view of a mirror assembly in accordance with the present invention, which has an optic assembly used for a lighted parking assist display auxiliary feature.

FIGS. 1-9 show certain embodiments of an optic assembly 20 in accordance with the present invention. Referring to the Figures, an optic assembly 20 shown in FIGS. 1-6 is designed to be used in connection with a mirror assembly 21 for a vehicle. Example embodiments of optic assemblies used in mirror assemblies 21 are shown in FIGS. 7-9, but other embodiments or applications are included within the scope of the present invention as well, including, but not limited to, puddle lights, lighting applications for which a generally rearward facing light or display would be useful, or for illuminating other types of lighted displays. The optic assembly 20 is positioned inside of a housing 22 for a mirror assembly 21, and is attached to a mirror 23 on the inside surface of the mirror. The optic assembly 20 shown is comprised of a reflector 24, a mask assembly 25, and one or more light sources 35, typically installed on a circuit board 26. Suitable light sources may include a variety of light bulbs, assemblies, or light emitters. LEDs are a preferred light source, however, because of their relatively small size, low heat emission, and low power consumption. One or more light sources may be electrically connected to a circuit board 26. The light source 35 or light sources are generally enclosed inside the optic assembly 20. Although the optic assembly 20 shown in FIGS. 1-6 uses two LEDs, it should be understood that other light sources, and any number of light sources could be used with an optic assembly in accordance with the present invention.

The optic assembly 20 shown in the Figures is shown in use with a mirror 23, but optic assembly 20 could also be used with other transparent or semitransparent substrates in other applications. When used with a mirror, the mirror could be coated with a variety of mirror coatings, including, but not limited to, a thin chrome coating as described in U.S. Pat. No. 6,045,243, laser ablated chrome, dichroic, silver, or an electrochromic mirror coating. Similarly, a variety of mounting adhesives may be used for attaching the optic assembly to the inside surface of the mirror. One such adhesive could be an acrylic such as 9495MP sold by 3M.

Figure 1:
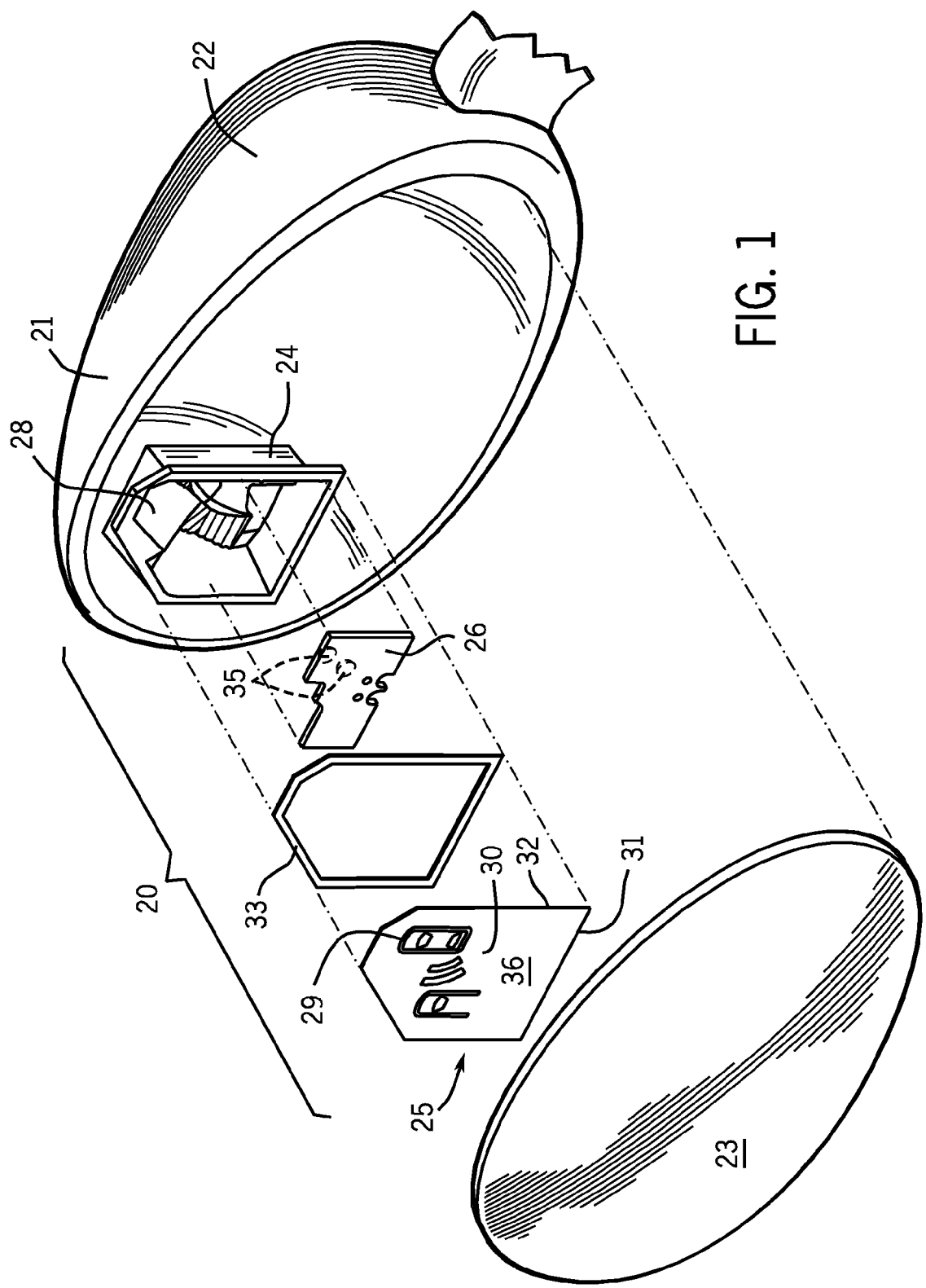
FIG. 1 is an exploded perspective view of a rearview mirror assembly showing an optic assembly in accordance with the present invention, used for a lighted blind spot detection display auxiliary feature where the optic assembly has two LEDs as light sources.

The mask assembly 25 of the optic assembly 20 (see FIGS. 1 and 2) generally covers the reflector 24 and circuit board 26 of the optic assembly, and is mounted to the mirror 23. The mask assembly 25 comprises a mask 36 that defines one or more apertures 29 through which light is emitted from the optic assembly 20 and ultimately through the mirror 23 or other semitransparent substrate. As discussed below, mask assembly 25 could be comprised of one substrate or piece, as shown in FIG. 1, but mask assembly 25 could also comprise multiple substrates, pieces, or components assembled or integrated so as to form mask assembly 25; e.g., including a separate diffuser or gasket. The mask assembly 25 has an outside surface 31 and an inside surface 32. The outside surface 31 of the mask assembly 25 defines at least a part of the exterior of the optic assembly 20 and may be adhered to the mirror 23 or other transparent or semitransparent substrate. The inside surface 32 of the mask assembly 25 faces the reflective surface 28 of the reflector 24. Aside from apertures 29 from which the light is emitted to form the icon 30, the mask assembly 25 otherwise substantially encloses the light source and light rays inside the optic assembly 20.

Figure 2:
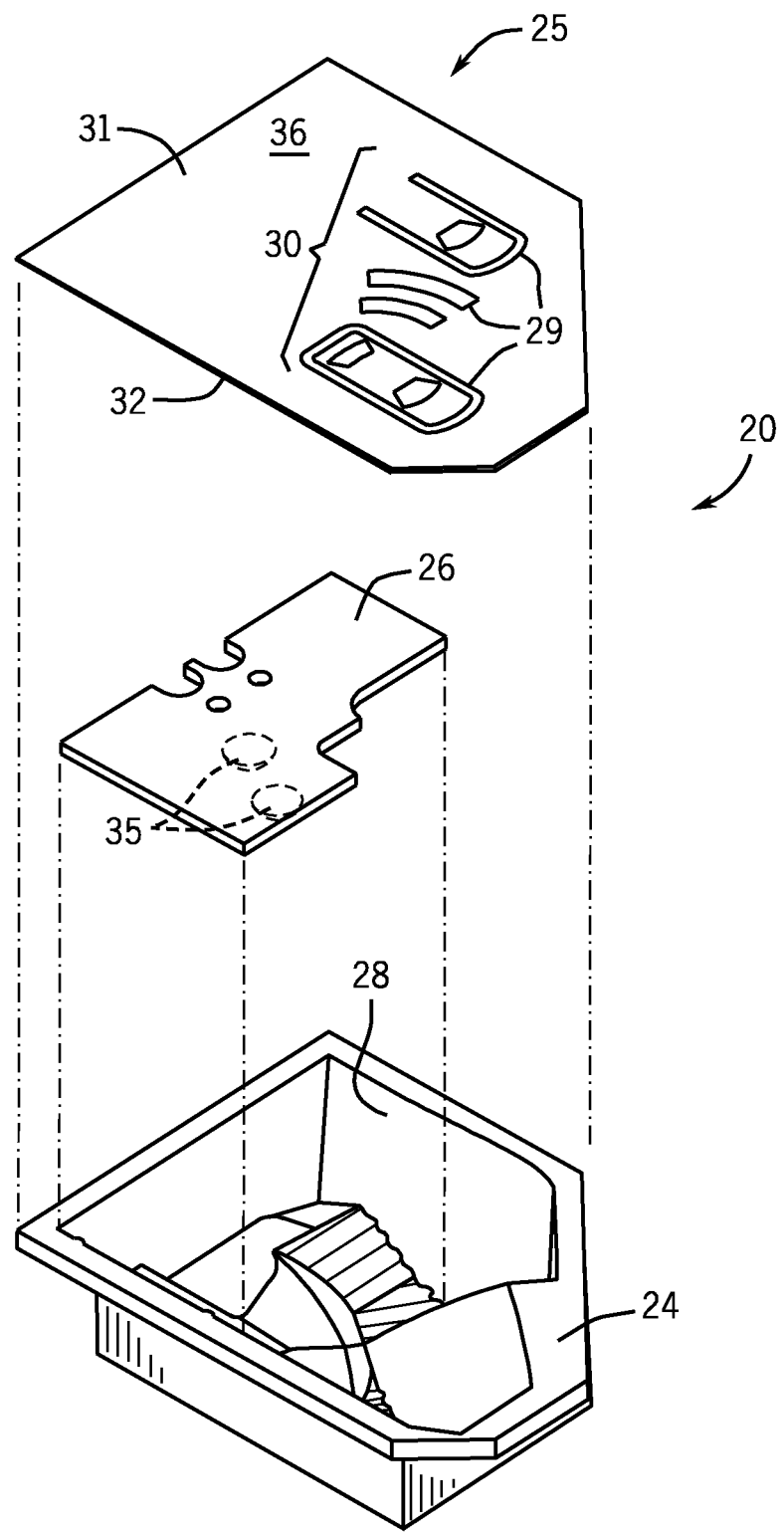
FIG. 2 is an exploded perspective view of the optic assembly shown in FIG. 1.

As shown in FIGS. 1-2, the mask assembly 25 is adhered to the reflector 24 with an adhesive, but the mating of the mask assembly 25 to the reflector 24 could be accomplished in any other suitable way, e.g., a screw connection. Additionally, a gasket 33, could be part of a mask assembly 25 or it could be an independent part (as shown in FIG. 1). For example, a gasket that is part of the mask assembly could be used as part of the mask 36 itself, or the gasket could be formed by or be integral with a circuit board 26. The gasket could also be positioned between the mask assembly 25 and the reflector 24. A gasket is not required for the invention but as a practical matter may save manufacturing or assembly costs by sealing irregularities in the mating surfaces. Although many materials may, of course, be used for a gasket, one material that could be used is a polyethylene foam with an acrylic adhesive such as 4492B sold by 3M. Alternatively, a circuit board or other item or items could be sandwiched at least partially between the mask assembly 25 and the reflector 24. And connectors such as screws or clamps could be used instead of adhesive to secure the position of the mask assembly 25 and the reflector 24 relative to each other.

The mask assembly 25 may also include a diffuser to spread or scatter light as desired in the particular application. Mask assembly 25, as shown in FIGS. 1 and 2, includes a mask 36 integral with a diffuser. A diffuser gives a lighted auxiliary feature a more uniform appearance and is often used on BSDDs. As in FIG. 1, the diffuser could be the substrate upon which a mask is provided, and could comprise the inside surface 32 of the mask assembly. For example, a substantially opaque (except for the transparent portions that align with the apertures) mask could be screen printed onto the diffuser, which may be made from a polycarbonate material such as Bayer PCVM Velvet Matte Polycarbonate. Alternatively, a diffuser could be a separate or partially separate component that forms a part of assembled mask assembly 25 or assembled optic assembly 20.

The aperture 29 or apertures in the mask assembly 25 define the icon 30 for the lighted auxiliary feature. The icon 30 is the symbol displayed on or through the mirror or other substrate that is partially or wholly illuminated by light from the optic assembly 20. The icons used in lighted auxiliary features can of course vary greatly and can comprise an infinite number of lighted or partially lighted designs. FIGS. 1, 2, 6, and 7 show an icon 30 that may be used, for example, for a lighted BSDD auxiliary feature. FIG. 8 shows an icon 30 that may be used, for example, for a lighted turn signal auxiliary feature. FIG. 9 shows an icon 30 that may be used, for example, for a lighted parking assist display auxiliary feature.

The reflector 24 is typically made from a polycarbonate plastic polymer with a vacuum metalized finish with a topcoat, but any suitable material could be used. Some examples include: stamped or die cast metal, plastic with painted or printed-on reflective surfaces can be used, or plastic with inmolded reflective areas can be used. The reflector 24 is connected to or mated with the mask assembly 25. The reflective surface 28 of the reflector 24 faces the inside surface of the mask assembly 32 and is angled, flat, curved, or otherwise shaped to generally direct and orient at least some of the light rays emitted from the light source. These angles, flats, curves, or other shapes that form the topography of the reflective surface 28 of the reflector 24 are referred to as "facets." Facets can be shaped in any way that allows them to orient light, and may be planar, curved, smooth, rough, irregular, regular or any other shape or surfacing technique that reflects or manages light rays.

Refocusing facets 37, converging facets 38, and scattering facets 39 are three types of facets. Refocusing facets 37 generally direct light rays within the optic assembly 20. As used herein "refocusing" refers to directing light rays from the natural focal point of the light source so that they appear to project from another focal point, i.e., such that light rays can be managed as if they were emitted from another focal point. For example, light from a light source is generally directed from a focal point, and a refocusing facet reflects light rays from the light source so that they appear to project from another different focal point. Converging facets 38 direct light from the inside of the optic assembly 20 to the outside of the optic assembly 20 through an aperture 29 or apertures in the mask assembly 25. As used herein "converging" refers to collecting and orienting light rays in substantial alignment with each other so they generally form a beam. Converging facets 38 may generally collimate light rays, which means that the light rays are oriented in a generally parallel direction in a beam. As a practical matter, and as known to those of ordinary skill in the art, it is impossible or nearly impossible to orient all the light rays in a perfectly parallel orientation, or in a perfectly converged orientation. Thus, converging facets and refocusing facets generally orient light rays in a desired direction, but it is not expected or required that this orientation be precisely converged or focused for each ray of light in a group of light rays. Scattering facets 39, best seen in FIGS. 3 and 4, attenuate or scatter the light rays within the optic assembly. Scattering facets 39 can be useful in an optic assembly 20 if an area of an optic is too bright. Scattering facets can be a variety of sizes to accomplish this; scattering facets may be relatively large, as shown for example in FIG. 3, or they may be as small as a fine roughness applied to a facet or to an area of reflective surface 28. Although refocusing facets 37, converging facets 38, and scattering facets 39 are identified specifically in the embodiment shown in FIGS. 3-5, it should be understood that facets could be shaped in many different configurations. Pending U.S. application Ser. No. 12/871,727 describes additional types of faceting that may be used, but other faceting techniques could be used as well.

The circuit board 26 is positioned at least partially between the mask assembly 25 and the reflector 24. The circuit board 26 is usually made of FR4 with 2 oz. copper but may be made of any suitable material. Light sources 35 for the optic assembly 20 will usually be electrically connected to a circuit board 26 but could also be powered by an alternative to a circuit board or from a location remote to the optic assembly 20. LEDs are commonly mounted on and powered by a circuit board 26, but a circuit board 26 could also be located remotely from one or more light sources. A circuit board 26 could be positioned in several different orientations in the optic assembly 20. For example, it may be positioned generally parallel to the mask assembly 25, so that a light source on the circuit board will essentially shine into the reflector 24. The circuit board 26 may also be positioned transversely or obliquely to the reflective surface 28. The orientation of the circuit board 26 and any associated light source with respect to the reflector can be varied depending on the desired lighted auxiliary feature or icon used and the space available. Additionally, the circuit board 26 may have one or more pigtail connections, such that the circuit board is pigtailed to the vehicle's control systems.

Because ballast resistors used in circuits, such as LED circuits, generate heat, it can be advantageous to use more than one LED (but far less than one LED per aperture) so that less voltage drop occurs over the resistor(s) and thus less energy is wasted in the production of heat. This arrangement can allow each LED to be run at a lower current while still achieving high total light output. This can achieve the effect of a more stable output over time, where the initial output more closely matches the "warmed up" output.

In a case where there is more than one light source, such as the two LED arrangement shown in FIGS. 1-5, it has been found advantageous to have refocusing facets 37 that create a virtual external common focus ("VEXCF") 40 for the light sources. This allows the converging facets 38 to be oriented generally to one focal point, which allows light from any of the light sources to be converged in any of the converging facets. This overspill of light from one facet to another, results in a very good combination of brightness and uniformity for an icon 30 display. It should be noted that the VEXCF 40 does not have to be perfectly common to a plurality of light sources. Even if it is only close, overspill of light can still be converged fairly effectively. It should also be understood that, even though the embodiment shown in FIGS. 1-5 uses two light sources, a VEXCF could be used effectively with one light source, such that a substantial portion of light rays within the optic assembly can be managed as if they were emitted from a focal point outside the optic assembly.

Using an external focal point (the VEXCF) 40 allows for greater tolerance of misalignment of components during assembly, because the refocused beams have a good deal of beam width by the time they reach the converging facets, and slight location shifts in the new focal point do not result in as dramatic a shift in beam direction. This is very beneficial when assembly is done by hand and because the light sources cannot always be positioned exactly in the proper location. Because of the thermal benefits, a VEXCF optic as described and shown in the Figures, can be very small and the components such as LEDs and resistors can be packed very closely together. This results in a compact optic assembly that provides enhanced lighting capabilities as compared to existing designs.

Figure 3:
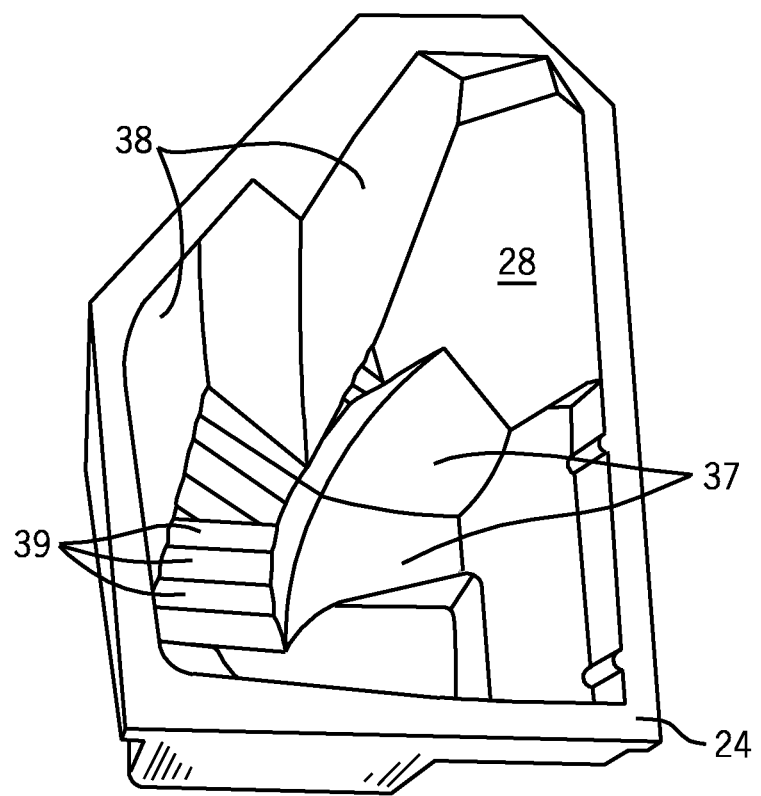
FIG. 3 is a top perspective view of the reflector of the optic assembly shown in FIG. 2.
Figure 4:
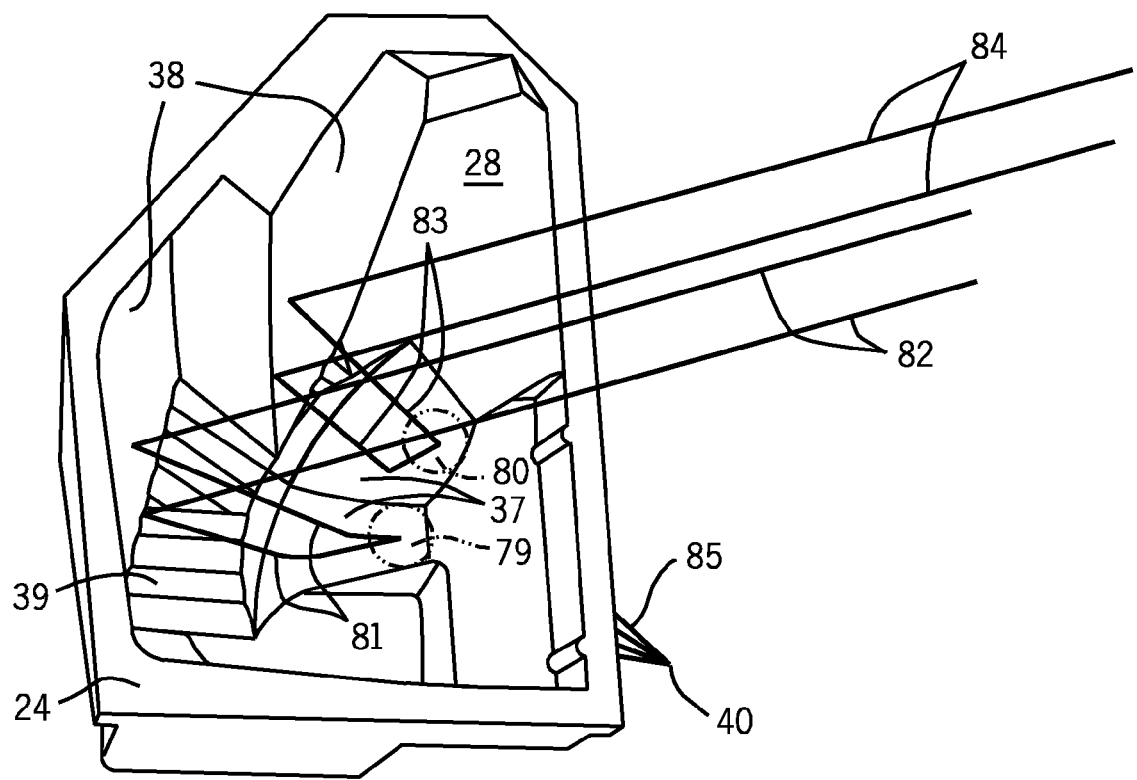
FIG. 4 is a top perspective view of the reflector of the optic assembly shown in FIG. 2, illustrating light rays being directed by facets in the reflector, and illustrating a virtual external common focus in accordance with the present invention.
Figure 5:
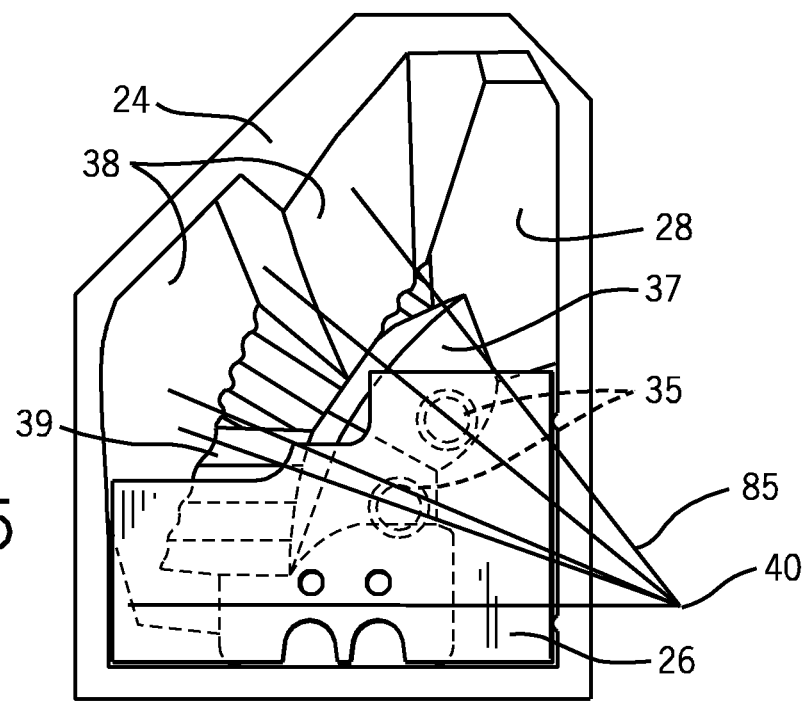
FIG. 5 is a top perspective view of the reflector of the optic assembly shown in FIG. 2, illustrating a virtual external common focus point common to both light sources.
Figure 6:
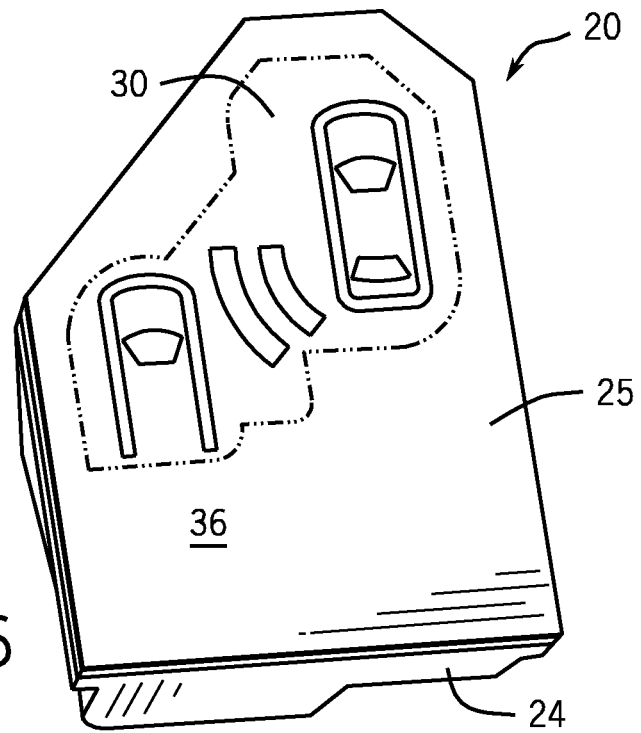
FIG. 6 is a top perspective view of the optic assembly of FIG. 1, shown with the mask in place and illustrating use of the assembly as a blind spot detection display (BSDD).

For a description of how the reflector 24 functions, reference is made to FIGS. 3-5, which show the reflector 24 of the optic assembly 20 of FIGS. 1 and 2. FIG. 3 shows reflector 24 and three types of facets: refocusing facts 37, converging facts 38, and scattering facts 39. FIG. 4 shows how light rays originating at light sources 35 are directed so that they are emitted through one or more apertures 29 in the mask assembly 25 and ultimately used in a lighted auxiliary feature. FIG. 4 shows the use of two light sources: a first light source 79 and second light source 80, with light rays emitted from both light sources. At least a portion of the light rays emitted from first light source 79 are directed by refocusing facts 37 to form a first set of refocused rays 81. At least a portion of the first set of refocused rays 81 are directed by converging facts 38 to form a first set of converged rays 82. At least a portion of the first set of converged rays 82 travel through an aperture 29 or apertures in the mask assembly 25 to provide illumination for the icon 30. Similarly for second light source 80, at least a portion of the light rays emitted from second light source 80 are directed by refocusing facts 37 to form a second set of refocused rays 83. At least a portion of the second set of refocused rays 83 are directed by converging facts 38 to form a second set of converged rays 84. At least a portion of the second set of converged rays 84 travel through an aperture 29 or apertures in mask assembly 25 to provide illumination for the icon 30. Scattering facts attenuate or weaken the intensity of light rays to provide greater uniformity of light in the optic assembly 20 or to lessen glare in directions where glare is undesirable such as the outboard direction. The management of light rays shown in FIG. 4 using facets is based on a VEXCF 40.

If the light sources 35 generally point away from the mirror, light rays may need to be substantially redirected or even substantially inverted to be directed to ultimately pass through the apertures 29 in the mask assembly 25 and through a mirror 23. Faceting can be used to accomplish this management and manipulation of light rays within the optic assembly 20. Converging facets 38 are generally positioned based on a common external focus point, namely VEXCF 40, that is external to the optic assembly 20. FIG. 5 best illustrates the VEXCF concept. The VEXCF is common to one or more light sources 35 for the optic assembly 20. The VEXCF 40 provides several advantages over existing optic arrangements. For example, the use of a VEXCF 40 can spread wattage between multiple light sources to give better thermal performance, i.e. the optic assembly produces less heat. Using a VEXCF in the design of optic assembly 20 can also allow for a more light in more compact designs; more than one light source can now be used in reflectors previously sized for only one light source. Using a VEXCF 40 also allows for improved uniformity in illumination across an icon 30. FIG. 5 shows the conceptual use of a VEXCF 40 when designing the faceting of reflector 24. Refocusing facets 37 are designed to manipulate and direct light rays so that a substantial portion of the light rays within the optic assembly 20 can be managed as if they were emitted from the VEXCF 40. Light rays 85 are manipulated so that they can be managed as if they originally emanated from VEXCF 40. The precise positioning, shape, dimensions, and reflective and faceting characteristics of a reflector will vary depending on the design requirements and constraints associated with a particular design and could be determined through known engineering and design techniques by a person of ordinary skill in the art.

The optic assembly 20 can be manufactured readily using standard techniques, including, but not limited to the following: rotary die cutting for the gasket 33; steel rule die cutting for the mask assembly 25 and diffuser; screen printing for the mask assembly when the mask is printed on the diffuser; injection molding, vacuum forming, and/or stereo lithography for the reflector 24; standard surface mount circuit board manufacturing techniques, or through-hole circuit board techniques.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. An optic assembly utilizing a virtual external common focal point, the optic assembly comprising:
 a reflector with a reflective surface, the reflective surface having a plurality of facets for reflecting light rays in a plurality of directions, the facets including one or more refocusing facets and one or more converging facets;
 a mask assembly defining one or more apertures, the mask assembly substantially enclosing the reflective surface of the reflector and mountable behind a substrate;
 a light source substantially enclosed between the mask assembly and reflector;
 the one or more refocusing facets direct light rays from the light source so that they become refocused light rays that appear to project from a virtual external common focal point located outside the optic assembly;
 the one or more converging facets direct the refocused light rays inside the optic assembly to the outside of the optic assembly through an aperture; and
 wherein the optic assembly is capable of illuminating an icon in the substrate.

2. The optic assembly of claim 1, wherein the substrate is a mirror.

3. The optic assembly of claim 1, wherein the mask assembly comprises:
 a diffuser capable of scattering light rays emitted from the light source; and
 a mask defining one or more apertures, the mask at least partially covering the diffuser such that the diffuser and mask enclose an area between the reflector and the mask assembly.

4. The optic assembly of claim 1, wherein the facets further comprise:
 scattering facets for attenuating at least a portion of light rays within the optic assembly.

5. The optic assembly of claim 1, wherein the facets comprise only one refocusing facet and only one converging facet for each aperture.

6. The optic assembly of claim 1, wherein the facets comprise only one converging facet for each aperture.

7. The optic assembly of claim 1, wherein the facets comprise a plurality of refocusing facets for each aperture.

8. The optic assembly of claim 1, wherein the facets comprise a plurality of converging facets for each aperture.

9. The optic assembly of claim 1, wherein the substrate is an automotive mirror assembly.

10. A method for directing light rays from one or more light sources in an optic assembly comprising the steps of:
 providing one or more light sources emitting light rays into a reflector, the reflector having a plurality of facets, the facets including one or more refocusing facets and one or more converging facets;
 substantially refocusing light rays from the one or more light sources using one or more refocusing facets so that a substantial portion of the light rays are directed so that they appear to project from a virtual external common focal point located outside the optic assembly;
 substantially converging at least a portion of the substantially refocused light rays using one or more converging facets on the reflector; and
 directing at least a portion of the refocused and converged light rays through an icon in the substrate.

11. A mirror assembly comprising:
 a housing;
 a substrate mounted in the housing, the substrate capable of functioning as a mirror;
 an optic assembly utilizing a virtual external common focal point, the optic assembly comprising:
  a reflector with a reflective surface having a plurality of facets for reflecting light rays in a plurality of directions, the facets including one or more refocusing facets and one or more converging facets;
  a mask assembly defining one or more apertures, the mask assembly substantially enclosing the reflective surface of the reflector and being capable of being mounted behind the substrate;
  a light source at least substantially enclosed between the mask assembly and reflector;
  the one or more refocusing facets direct light rays from the light source so that they become refocused light rays that appear to project from a virtual external common focal point located outside the optic assembly;
  the one or more converging facets direct the refocused light rays inside the optic assembly to the outside of the optic assembly through an aperture; and
  wherein the optic assembly is capable of illuminating an icon in the substrate.

* * * * *